A. OVEROCKER.
Clover Huller.
No. 24,657.
Patented July 5, 1859.
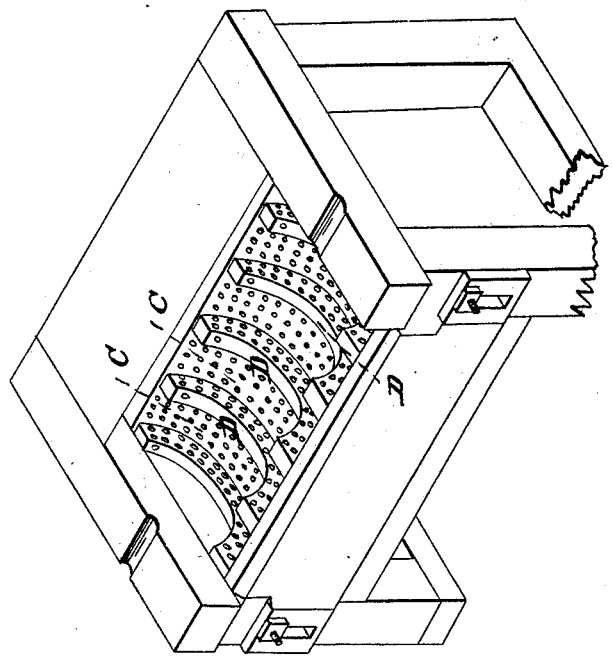
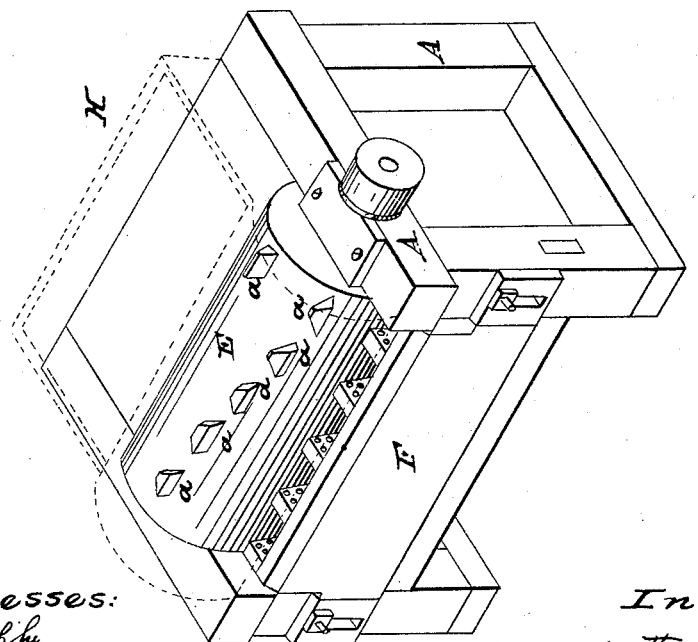
Witnesses:
J. D. Murphy
E. E. Thomas
Inventor:
Anthony Overocker

UNITED STATES PATENT OFFICE.

ANTHONY OVEROCKER, OF McHENRY, ILLINOIS.

CLOVER-HULLER.

Specification of Letters Patent No. 24,657, dated July 5, 1859.

*To all whom it may concern:*

Be it known that I, ANTHONY OVEROCKER, of McHenry, in the county of McHenry and State of Illinois, have invented certain new and useful Improvements in Clover-Hullers; and I do hereby declare that the following is a full, clear, and exact description of the same, reference being had to the accompanying drawings and to the letters of reference marked thereon.

The nature of my invention consists in constructing and arranging the several parts of a huller, substantially as will be described.

In the drawings Figure 1 represents a perspective view of the machine with the cylinder secured in operating position. Fig. 2 represents a perspective with cylinder removed.

In the figures A, A, represent a square frame constructed of any suitable size or material. Within this frame is secured a metallic concave box C,—said concave being provided with burs or rasps, as is shown.

(D, D,) represent a series of ribs which are secured in the concave C, at a suitable distance apart. The tops of these ribs are concave and their sides are provided with burs, or rasps, similar to those on the surface of the concave C.

E, represents a cylinder the axis of which rests upon the frame, A. This cylinder is made to revolve in the concave, the convexity of its periphery being made to correspond with the concavity of the ribs, said cylinder running so close to the ribs that the seed are not allowed to intervene between them. The cylinder E, is provided on its periphery with a series of teeth (a, a, a,) which are constructed as represented in the drawing. These teeth are placed at a sufficient distance apart, to work in the space between the ribs (D,) and to fill up that space to within the thickness of the seed, on each side.

H, (seen in dotted line) represents a cover which is placed over the cylinder and concave to prevent the seed from being thrown out.

F, is a sliding door, secured to one side of the frame, for the purpose of removing the grain when necessary. When this door is shoved up its top fits against the cover H, and when in this position prevents the grain from escaping but when lowered and the cylinder revolved the grain will be driven out at the opening between it and the cover.

The clover to be hulled is placed in the concave, C, and the cylinder being set in motion the grain is hulled and cleaned by the action of the teeth and the burs and rasps on the ribs and concave.

Having thus fully described my invention what I claim as new and desire to secure by Letters Patent is—

The combination of the concave, C, and cylinder E, with the adjustable sliding door, F, the several parts being arranged and constructed substantially in the manner and for the purpose described.

ANTHONY OVEROCKER.

Witnesses:
 E. E. THOMAS,
 T. D. MURPHY.